US012703050B2

(12) United States Patent
Mastor et al.

(10) Patent No.: US 12,703,050 B2
(45) Date of Patent: Aug. 11, 2026

(54) MULTI-COMPONENT FLUX

(71) Applicant: PYROTEK, INC., Spokane, WA (US)

(72) Inventors: Michael Mastor, Spokane, WA (US); Viktor Slavicek, Brno (CZ); Xin Zuo, Shenzhen City (CN); Vijay Hargude, Maharashtra (IN)

(73) Assignee: Pyrotek, Inc., Spokane, WA (US)

( * ) Notice: Subject to any disclaimer, the term of this patent is extended or adjusted under 35 U.S.C. 154(b) by 603 days.

(21) Appl. No.: 18/019,076

(22) PCT Filed: Aug. 3, 2021

(86) PCT No.: PCT/US2021/044370
§ 371 (c)(1),
(2) Date: Jan. 31, 2023

(87) PCT Pub. No.: WO2022/031721
PCT Pub. Date: Feb. 10, 2022

(65) Prior Publication Data

US 2023/0278146 A1 Sep. 7, 2023

Related U.S. Application Data

(60) Provisional application No. 63/061,556, filed on Aug. 5, 2020.

(51) Int. Cl.

| | |
|---|---|
| ***B23K 35/362*** | (2006.01) |
| ***B23K 35/36*** | (2006.01) |
| ***C22B 9/10*** | (2006.01) |
| ***C22B 19/32*** | (2006.01) |
| ***C22B 21/06*** | (2006.01) |
| ***C22B 26/12*** | (2006.01) |
| ***C22B 26/22*** | (2006.01) |

(52) U.S. Cl.
CPC ........ *B23K 35/362* (2013.01); *B23K 35/3602* (2013.01); *B23K 35/3603* (2013.01); *C22B 9/10* (2013.01); *C22B 21/062* (2013.01); *C22B 19/32* (2013.01); *C22B 26/12* (2013.01); *C22B 26/22* (2013.01)

(58) Field of Classification Search
CPC ...... B23K 35/362; C22B 21/062; C22B 26/22
USPC ...................... 148/26; 75/603, 604, 682–384
See application file for complete search history.

(56) References Cited

U.S. PATENT DOCUMENTS

| | | | |
|---|---|---|---|
| 3,793,004 | A | 2/1974 | Boddey et al. |
| 4,501,614 | A | 2/1985 | Bauer et al. |

(Continued)

FOREIGN PATENT DOCUMENTS

| | | | |
|---|---|---|---|
| CA | 3031491 | A1 | 1/2020 |
| CN | 1472350 | A | 2/2004 |

(Continued)

OTHER PUBLICATIONS

Schwartz, Harold. U.S. Standard Sieve Sizes. ProKon: The Calculation Companion. (Year: 1998).*

(Continued)

*Primary Examiner* — Tima M. Mcguthry-Banks
(74) *Attorney, Agent, or Firm* — Lippes Mathias LLP

(57) ABSTRACT

A solid metal flux comprised of compacted granules including (a) alkali chloride salt, (b) alkaline earth chloride salt and (c) at least one nitrate, carbonate, or sulfate salt and/or a fluoride containing salt.

13 Claims, 1 Drawing Sheet

(56) References Cited

U.S. PATENT DOCUMENTS

| | | | | |
|---|---|---|---|---|
| 5,804,138 | A | 9/1998 | Earlam | |
| 7,988,763 | B2 * | 8/2011 | Tremblay | C22B 9/10 75/685 |
| 2004/0065172 | A1 | 4/2004 | Fujimoto et al. | |
| 2009/0007989 | A1 | 1/2009 | Ohm | |
| 2011/0185850 | A1 | 8/2011 | Kientzler et al. | |
| 2012/0017726 | A1 * | 1/2012 | Tremblay | C22B 9/10 75/678 |

FOREIGN PATENT DOCUMENTS

| | | | | |
|---|---|---|---|---|
| CN | 101250636 | A | 8/2008 | |
| CN | 102560164 | A | 7/2012 | |
| CN | 102676854 | A | 9/2012 | |
| CN | 109097618 | A | 12/2018 | |
| CN | 111424186 | A | 7/2020 | |
| GB | 1549979 | A | 8/1979 | |
| IN | 432/CHE/2004 | * | 11/2004 | B23K 35/362 |
| JP | 2038539 | A | 2/1990 | |
| JP | 2004143483 | A | 5/2004 | |
| KR | 20130011317 | A * | 1/2013 | C22B 21/062 |

OTHER PUBLICATIONS

KR20130011317A, machine translation of the bibliography, claims, and description. (Year: 2013).*

CN 109097618A. Machine translation. (Year: 2018).*

CN 1472350A. Machine translation (Year: 2004).*

Encyclopaedia Britannica. “eutectic”. Access date May 9, 2025. https://www.brittanica.com/science/eutectic (Year: 2016).*

T. A. Utigard; “The properties and uses of fluxes in molten aluminum processing”; JOM vol. 50, No. 11; Nov. 1, 1998; pp. 38-43.

Search Report for European Patent No. 21852620.0, dated Dec. 18, 2024, 13 pages.

International Search Report for Application No. PCT/US2021/044370, dated Nov. 8, 2021, 3 pages.

* cited by examiner

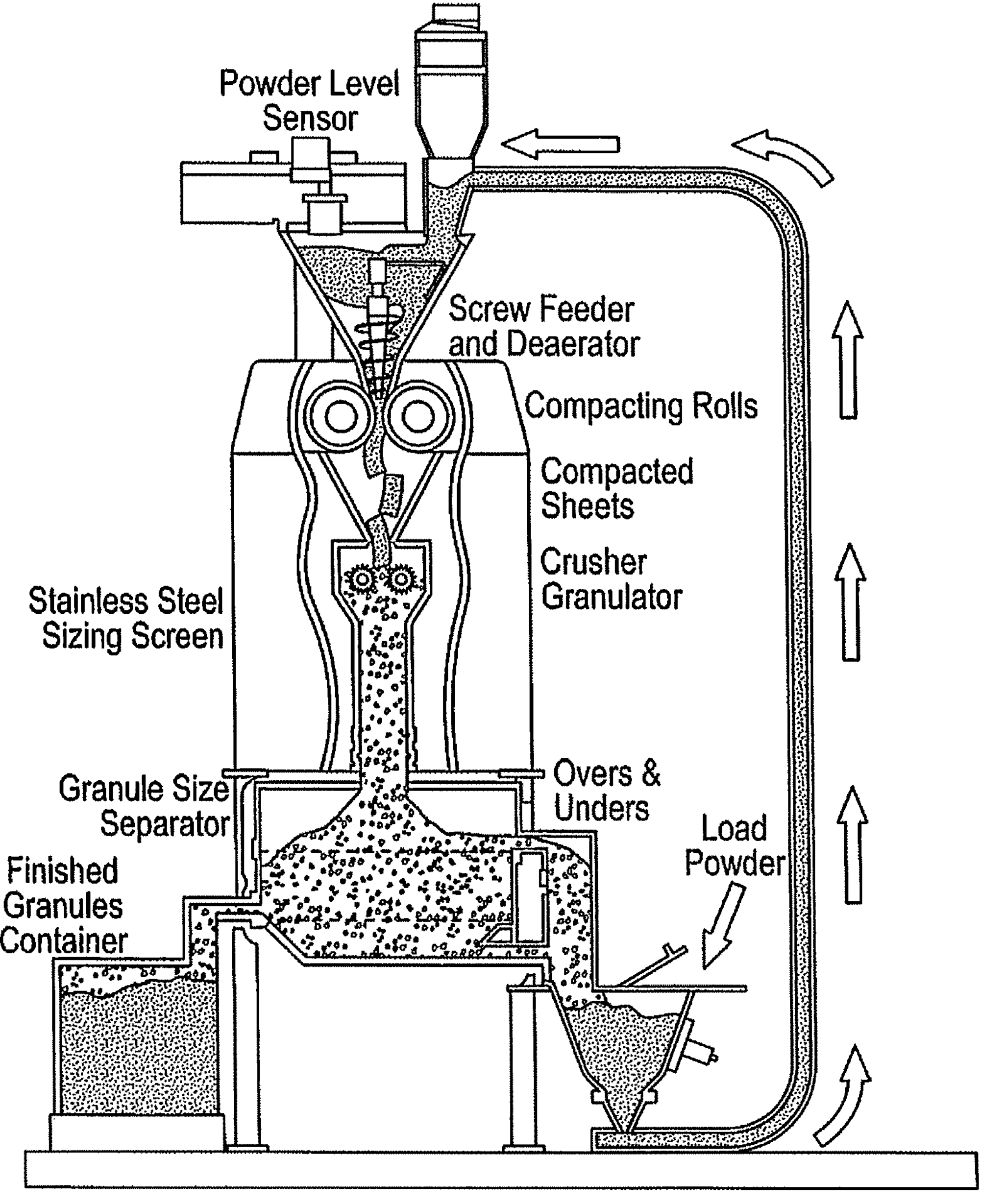
Powder Level
Sensor
Screw Feeder
and Deaerator
Compacting Rolls
Compacted
Sheets
Crusher
Granulator
Stainless Steel
Sizing Screen
Granule Size
Separator
Overs &
Unders
Load
Powder
Finished
Granules
Container

MULTI-COMPONENT FLUX

This application claims the benefit of U.S. Provisional Application No. 63/061,556 filed Aug. 5, 2020, the disclosure of which is incorporated herein by reference.

BACKGROUND

The present exemplary embodiment relates to a unique flux compound. It finds particular application as a salt inclusive flux compound which is used for the treatment of aluminum, aluminum alloys, and other non-ferrous metals such as zinc, lithium, or magnesium, and their alloys.

The present disclosure relates to the use of a salt flux for the treatment of a metal such as aluminum and aluminum alloys. Fluxes that are based on alkali chlorides and alkaline-earth chlorides are frequently used for the refining of alloys. Flux can also be used to form a protective layer at the surface of an alloy to prevent oxidation. Some fluxes are also used for cleaning dross and removing aluminum trapped in oxide layers.

Traditionally, the refining of aluminum was carried out by filtration, degassing and/or bubbling of chlorine into a molten metal. Use of chlorine is particularly effective but creates environmental problems due to emissions of chlorine and hydrochloric acid. The use of salt blends was adopted as a more ecologically friendly solution. Salt blends are commonly known in the metal industry as “flux”.

Sodium and calcium are always present as impurities in aluminum obtained from the Hall-Heroult process. Unfortunately, in an aluminum alloy containing magnesium, the presence of sodium may interfere in the hot rolling processes. $MgCl_2$ is one of the chemical active agents used for the withdrawal of impurities in alloys. Its concentration and distribution have a direct effect on the kinetic of withdrawal of calcium and sodium.

There are, of course, many examples of fluxes that are based on magnesium chloride. U.S. Pat. No. 1,377,374 relates to the use of a flux having an equimolar composition of sodium chloride and magnesium chloride for the production of manganese or magnesium alloys. U.S. Pat. No. 1,754,788 relates to the use of this same flux in a process for the cleaning of magnesium. U.S. Pat. No. 1,519,128 relates to the addition of calcium chloride to this composition. U.S. Pat. No. 2,262,105 relates to the addition of potassium chloride and magnesium oxide in addition to calcium chloride. U.S. Pat. No. 5,405,427 mentions a flux based on sodium chloride, magnesium chloride, potassium chloride and carbon for the treatment of metal. Each of these patents is herein incorporated by reference.

Several methods can be used to incorporate salt fluxes in an alloy. U.S. Pat. No. 4,099,965 (the disclosure of which is herein incorporated by reference) relates to a method where a flux is added in solid form in the bottom of a preheated container before the addition of aluminum. More currently, fluxes are added by an inert gas in a pipe under the surface of the metal (lance fluxing). Alternatively, a hollow shaft brings the salt flux into the alloy with a gas carrier, and the salt flux is dispersed by an agitator (rotary flux injection). This method reduces the amount of salt flux required for carrying out the purification while increasing the dispersion of the salt flux in the alloy. Following the addition of a salt flux to the metal, impurities, and salts most typically float on the surface of the liquid metal and can be removed.

The present disclosure is directed to a flux material providing the major advantages of flux addition to molten metals wherein the flux materials are present as a combination in granulated particles having a process friendly melting temperature. Embodiments of the present disclosure show the following advantages: economic advantages; lower production costs; lower costs of raw material; efficiency equivalent to the purification methods using existing well known salt flux; and economic alternative to existing salt flux without creating any significant accumulation of sodium within aluminum or aluminum alloys weight and more particularly aluminum alloys having magnesium content higher than 3% by weight.

BRIEF DESCRIPTION OF THE DRAWINGS

The following is a brief description of the drawings, which are presented for the purposes of illustrating the exemplary embodiments disclosed herein and not for the purposes of limiting the same.

The FIG. 1*s* a schematic illustration of an exemplary apparatus suitable for manufacturing of the present flux.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a solid metal flux comprised of compacted granules is provided. The flux includes (a) alkali chloride salt, (b) alkaline-earth chloride salt, and (c) at least one salt of nitrate, carbonate, sulfate or mixture thereof and/or a fluoride containing salt.

According to a further embodiment, a method for the treatment of a metal bath is provided. The method includes combining alkali chloride salt, alkaline-earth chloride salt, and at least one salt of nitrate, carbonate, sulfate or a combination thereof and/or a fluoride containing salt to form a mixture. Granules are formed from the mixture and added to the metal bath.

According to a further embodiment, a method of making the salt of paragraph is provided. The method comprises providing the materials in powder form, mixing the combined materials, melting the combined materials, solidifying the melted combined materials to obtain a fused compound, and crushing then sieving the fused compound.

According to another embodiment, a method of making the salt of paragraph [0012] is provided. The method comprises providing the salts in powder form, wherein at least the fines of a fused binary salt material are included, mixing the combined salts, compacting the combined salts, and crushing then sieving the compacted material.

DETAILED DESCRIPTION

A more complete understanding of the components, processes and apparatuses disclosed herein can be obtained by reference to the accompanying drawing. The FIGURE is a schematic representation based on convenience and the ease of demonstrating the present disclosure, and is, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms about, generally and substantially are intended to encompass structural or numerical modifications which do not significantly affect the purpose of the element or number modified by such term.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

The present disclosure is directed to a unique fused flux granulated material which can be used for the treatment of aluminum, aluminum alloys, and other non-ferrous metals such as zinc, lithium, or magnesium and their alloys. Fused flux is intended to encompass granules that are a blend of salt compounds. The skilled artisan will recognize that the term granule is intended to encompass forms such as particles, briquettes, pellets, strips, shavings, etc.

Flux can be distributed into or on top of molten metal baths using a variety of techniques. The phrase "metal bath" is understood to mean any melt of a metal in which a major portion of the metal is present in liquid form, and only a small part is present in solid form, for example as an ingredient of a scab or as an ingredient of slag. Liquid metal streams are also referred to as metal baths.

The flux is introduced to the metal bath to physically and chemically intereact and refine the metal. The most effective treatment methods for inclusion and alkali removal are generally those employing some type of sub-surface distribution technique (e.g., inert gas injection) and stirring, such as by means of mechanical rotors or electromagnetic pumps/inductors.

The present flux material advantageously provides at least three major metal treatment functions. The three functional aspects of the present flux can include: (1) to remove unwanted non-metallic inclusions and impurities, (2) to remove alkali and alkali earth elements (sodium, calcium, and lithium) and (3) to dry layers of metal oxide "dross" that form on the surface of metal baths (i.e., lower liquid metal content in dross layers). In certain embodiments, the present flux material will also provide grain refinement, hydrogen removal and/or chemistry modification. A good source of information regarding the effect of various flux materials can be found in the article "The Properties and Uses of Fluxes in Molten Aluminum Processing", by Utigard, Friesen, Roy, Lim, Silny and Dupuis, JOM, November 1998, the disclosure of which is herein incorporated by reference.

One of the components can be an alkali chloride salt, such as sodium (Na) chloride and/or potassium (K) chloride and/or lithium (Li) chloride. The alkali chloride salt can fuse with aluminum oxides at relatively low temperatures, enabling removal through a chemical reaction or by means of physical separation. Similarly, after forming liquids in the melt, these salts also help by removing inclusions and supplement hydrogen removal through flotation. In addition, the alkali chloride salt can provide a covering effect on the melt to prevent additional oxidation of the molten metal. The alkali chloride salt can also react at the interface of the aluminum and the dross, penetrating the oxide skin that contains trapped liquid aluminum. Alkali chloride salt can also clean the furnace environment when injected subsurface.

Another of the components can be an alkaline-earth chloride salt, such as magnesium (Mg), barium (Ba), strontium (Sr), and/or calcium (Ca) chloride. The alkaline-earth chloride salt can be used to remove alkali and alkaline earth elements to ppm or lower levels, and in many instances can replace chlorine. The alkaline-earth chloride salt can also form a eutectic with the alkali chloride salt to provide a lower salt melting temperature.

Another of the components can be fluoride salts such as earth alkali fluorides, aluminum fluoride, and/or double salts, e.g. alkali metal fluorides, calcium fluoride, sodium aluminum fluoride, potassium aluminum fluoride, sodium borofluoride, potassium borofluoride and alkali metal silicofluorides. The fluoride salts can lower the surface tension of the aluminum, allowing droplet coalescence. Some fluorides can also affect metal chemistry, such as $AlF_3$, which removes magnesium and alkali elements. Fluorides are also generally known in literature to lower surface tension between the flux and the metal, and the flux and the metal oxides. Also, it is thought that aluminum oxides are slightly soluble in them, so they help to break up dross.

The flux may also advantageously contain salts of carbonate, sulfate, and/or nitrate, particularly alkali and/or earth alkali carbonate, sulfate, and/or nitrate. These compounds provide an advantageous scabbing behavior to assist in dross drying. These salts can also enable aluminum particles in the dross to ignite with the evolution of heat. This exothermic reaction, coupled with the presence of fluoride salts from the flux, enables the metal particles to coalesce, allowing them to separate back into the metal bath from the dross.

The flux can be composed of engineered ratios of at least three of the following families of salt constituents: akali chloride salt(s) (e.g., LiCl2, NaCl, KCl); alkaline-earth chloride salt(s) (e.g., MgCl2, CaCl2, SrCl2, BaCl2); salt(s) containing fluorine (e.g., NaF, CaF2, MgF, AlF3, NaAlF6, Na2SiF6, KAlF4, etc.); and nitrate, carbonate, or sulfate salts (e.g., CaCO3, KNO3, K2SO4). In certain embodiments, all four of the salt constituent categories will be present.

Generally, the alkali chloride salts can comprise the highest concentration of the overall flux composition. Alternatively, the alkaline-earth salts can comprise the highest concentration of the overall flux composition.

An exemplary composition of the flux can include alkali chloride salt between about 25 and 75 wt. % or about 30 and 75 wt. %, alkaline-earth chloride salt between about 5 and 60 wt. % or about 20 and 60 wt. %, and/or at least one nitrate, carbonate, or sulfate salt between about 5 and 25 wt. % or about 8 and 18 wt. % (when present), and/or a fluoride containing salt between about 5 and 25 wt. % (when present). In order to ensure the effectiveness of the individual components, it is advantageous if they are present at not less than 5% in the metal bath flux, in each instance.

In select embodiments, the chemistry of each granule is at least a substantially even distribution of the raw material salts. Similarly, a granule-to-granule comparison of a flux batch will yield a substantially insignificant variation in raw material concentration (e.g. less than about 5% variation).

The flux composition is provided in the form of granules, wherein each granule comprises at least three separate solid components (i.e. the listed salts). "Separate solid components" is to be understood to mean that the components are not chemically combined to a significant extent, but rather the different salts are physically pressed into a single granule. The components can react in the bath to the desired extent while still in the solid state, allowing the components to be separated in the melt and distributed accordingly. Moreover, some of the salt will liquify at molten metal temperatures. Other salts, such as the nitrates, carbonates, or sulfates, will begin to react.

The subject flux granules advantageously provide efficient alkali and inclusion removal; efficient dross drying action for reduced metal content in dross and improved melt recovery; replacement or reduction of chlorine injection and chlorine emissions; standard grain size for injection through rotary and lance flux injection systems; reduced hygroscopic; are more effective than equivalent powder blends, requiring lower application rates and; improved furnace cleanliness and reproducibility between furnace batches.

The present flux material advantageously has been found to be a eutectic, allowing certain of its ingredients to be melted into the molten metal at a lower temperature than if introduced separately. The present flux material can have a melting point between about 400° and 800° C., and can be less than 720° C. For certain applications, it may be desirable to have a flux melting point between 400° and 600° C. Moreover, a rapidly melting flux can be beneficial to overall performance.

The present flux granules can achieve a corresponding purification capacity of known single or binary metal bath salt fluxes since identical components can be used. However, the method of the present disclosure is significantly more economical than conventional methods, since only one application step for the metal bath flux is required and can be carried out with extreme operational reliability.

Other advantageous of providing the ingredients commingled in granules include that each location being treated by the flux is receiving all treatment components (i.e., dross drying action, surface tension reduction, alkali cleaning, etc.). In addition, there is reduced waste of salts which can be lost due to unwanted burning at high temperature. Furthermore, there is reduced waste of lightweight aggregate which can be blown by furnace exhaust systems or burner systems.

The present flux material can have a density between about 1.5 and 2.0 g/cm$^3$. The grain sizes of the granulated material can vary within a certain band width. An exemplary range is between greater than 0 mm and 6 mm, particularly between 0.5 mm and 4 mm, or between 0.8 and 3 mm. In this connection, it is understood that grain sizes are generally present in distributions, for example in Gaussian distributions.

The granulate can have sufficient inherent stability to be easily supplied to a metal bath. Likewise, storage over an extended period is easily possible, since granulates are relatively chemically stable and can easily be protected against outside influences. Furthermore, the subject granulates are sufficiently durable to at least substantially retain their structure during shipping.

Furthermore, if the fused binary compound is the source of $MgCl_2$, the process advantageously avoids the use of $MgCl_2$ alone which is undesirably hygroscopic and becomes sticky and can bind handling equipment. Sticky flux from moisture absorption is undesirable because it is important to avoid moisture in molten aluminum furnaces. Moreover, moisture is a source of hydrogen and a safety hazard by causing explosions or "steam pops" in the metal.

The granulated particulate flux of the present disclosure can be formed for example by blending the desired constituents in powder form. The blended powder is then compacted under high pressure (e.g. roll compacting) to form either briquettes or rolled ribbons. The briquette/ribbon form is then granulated using milling techniques (e.g. crushing) and sieved to a desired particle size distribution. The Roll Compaction System of the FIGURE is a suitable apparatus for production of the flux of the present disclosure.

In this process, it is potentially advantageous that at least two of the salt raw materials are provided as an already fused binary material. The binary material can be obtained from the fines of a multifaceted refining agent (e.g. Promag® Plus). The use of binary fines as a starting material has been found to improve product yield, improve chemistry uniformity within granules and granule-to-granule, and improve particulate durability (e.g. less brittle).

Alternatively, all the components individually can be granulated jointly by mixing the salts in an anhydrous solid phase in a furnace. The temperature of the oven is increased to achieve a fused compound in liquid form. The liquid can be cooled, ground and sieved to obtain a desired granulometry.

The granulate particulate flux can also be obtained from liquid solutions, for example by cultivating crystals or by recrystallization.

EXAMPLES

A production line was prepped by cleaning to remove any impurities from previous production runs. Raw materials were weighed and prepared in intermediate containers according to the weight percent ratio 5% KCl, 5% KNO3, 10% K2SO4, 15% MgCl2, 15% AlF3, 50% Promag RI Fines/Powder (Promag RI=43% MgCl2, 57% KCl) for preparation of a minimum 150 kg batch. A minimum batch size is desirable for homogeneous mixing.

Raw materials were fed slowly into a horizontal, double ribbon mixer on low mixing speed to prevent excess dust. After the raw materials were fed into the mixer, the mixer was sealed and the mixing speed increased. Mixing continued until a homogeneous mixture was obtained.

Mixed raw materials were fed by a sealed screw auger into a roll-compacting unit where the powdered raw materials were compacted into an intermediate compacted ribbon product. This intermediate product was checked for quality and hardness before being passed into a crusher.

The crusher broke intermediate compacted ribbons into smaller granules, which were fed by conveyor into an industrial scale vibrating sieve assembly, Nominal grain size was determined to be in the acceptable range (nominally 1-3 mm), Granules larger than the nominal range were fed back to the crusher in a recycle stream and fines (<1 mm) were fed back to the compactor. Finished sieved products were packed in air-tight, polyethylene bags to prevent any air or moisture ingress.

The produced flux granules were evaluated using rotary injection into what is called a "Transfer Ladle", common to aluminum foundries. The resultant aluminum demonstrated good alkali removal and dross drying.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A method for the treatment of a metal bath comprising forming a fused binary salt of at least alkali chloride salt and alkaline earth chloride salt and obtaining the fines thereof, combining the fines with at least one nitrate, carbonate, sulfate salt, or fluoride containing salt to form a mixture, wherein the mixture is fused, compacted, crushed and sieved to form granules, and supplying the granules to the metal bath.

2. The method of claim 1 wherein the mixture is comprised of between 25 and 75 wt. % alkali chloride salt, between 5 and 60 wt. % alkaline-earth chloride salt, between 5 and 25 wt. % fluoride containing salt, and between 5 and 25 wt. % of a nitrate, carbonate, or sulfate salt.

3. The method of claim 1 wherein the mixture is comprised of between 30 and 75 wt. % alkali chloride salt, between 20 and 60 wt. % alkaline-earth chloride salt, between 5 and 25 wt. % fluoride containing salt, and between 8 and 18 wt. % of a nitrate, carbonate, or sulfate salt.

4. The method of claim 1 wherein the alkali chloride salt comprises the largest percentage of the mixture by weight.

5. The method of claim 1 wherein the alkaline-earth chloride salt comprises the largest percentage of the mixture by weight.

6. The method of claim 1 wherein the mixture has a melting temperature of between 420 and 800° C.

7. The method of claim 1 wherein the granules have a size between about 1 and 3 mm.

8. The method of claim 1 wherein the granules have a density between about 1.5 and 2.0 g/cm$^3$.

9. The method of claim 1 wherein the mixture includes the fluoride containing salt.

10. The method of claim 1 wherein the mixture includes at least one nitrate, carbonate or sulfate salt and a fluoride containing salt.

11. The method of claim 1 wherein the metal bath is comprised of molten aluminum.

12. A method for the treatment of a metal bath comprising forming a fused binary salt of at least alkali chloride salt and alkaline earth chloride salt and obtaining the fines thereof, combining the fines with at least one nitrate, carbonate, sulfate salt, or fluoride containing salt to form a mixture, wherein the mixture is fused, crushed and sieved to form granules having a size between about 1 and 3 mm, and supplying the granules to the metal bath.

13. A method for the treatment of a metal bath comprising forming a fused binary salt of at least alkali chloride salt and alkaline earth chloride salt and obtaining the fines thereof, combining the fines with at least one nitrate, carbonate, sulfate salt, or fluoride containing salt to form a mixture, wherein the mixture is fused, crushed and sieved to form granules having a density between about 1.5 and 2.0 g/cm$^3$, and supplying the granules to the metal bath.

* * * * *